United States Patent
Aydin et al.

(10) Patent No.: US 7,983,221 B2
(45) Date of Patent: Jul. 19, 2011

(54) METHOD AND APPARATUS FOR RADIO LINK FAILURE RECOVERY IN A WIRELESS COMMUNICATIONS NETWORK

(75) Inventors: Osman Aydin, Stuttgart (DE); Stephen Kaminski, Eislingen (DE)

(73) Assignee: Alcatel Lucent, Paris (FR)

( * ) Notice: Subject to any disclaimer, the term of this patent is extended or adjusted under 35 U.S.C. 154(b) by 107 days.

(21) Appl. No.: 12/364,652

(22) Filed: Feb. 3, 2009

(65) Prior Publication Data

US 2009/0196168 A1 Aug. 6, 2009

(30) Foreign Application Priority Data

Feb. 4, 2008 (EP) .................................... 08290098

(51) Int. Cl.
*H04W 4/00* (2009.01)
(52) U.S. Cl. ......................................................... 370/331
(58) Field of Classification Search .......... 370/331–334; 455/436–444
See application file for complete search history.

(56) References Cited

U.S. PATENT DOCUMENTS

| 2005/0250498 | A1* | 11/2005 | Lim et al. ...................... 455/436 |
| 2007/0286125 | A1* | 12/2007 | Lee et al. ...................... 370/331 |
| 2008/0144612 | A1* | 6/2008 | Honkasalo et al. ........... 370/370 |

OTHER PUBLICATIONS

Extended European Search Report mailed Jul. 29, 2008.
International Search Report and Written Opinion mailed Mar. 26, 2009.
Nokia Siemens Networks et al: "Radio Link Failure Recovery" XP-002467181, R2-072382, 3GPP TSG-RAN WG2 Meeting #58, Jun. 25-29, 2007, 8 pgs.
Vodafone Group: "Mobility in LTE_ACTIVE state" XP-002467180, R2-072823, 3GPP TSG-RAN WG2#58bis, Jun. 25-29, 2007, 6 pgs.

* cited by examiner

*Primary Examiner* — Kwang B Yao
*Assistant Examiner* — Kenan Cehic
(74) *Attorney, Agent, or Firm* — Fay Sharpe LLP

(57) ABSTRACT

In a method for radio link failure (RLF) recovery in a wireless communications network, a timer T sets a predetermined time period from a command to a mobile terminal UE to hand over to a new eNB. Resources are reserved at a target eNB 2. If the time period expires without the UE attaching to the target eNB 2, the source eNB requests other candidate eNBs 3 and 4 to reserve resources. Once the UE associates with the target eNB 2, the resources reserved at candidate eNBs 3 and 4 are released. If the UE associates with the target eNB 2 prior to expiry of the time period T, resources are not unnecessarily reserved at the candidate eNBs 3 and 4. If the UE associates with one of the candidate eNB 3 instead of the target eNB 2, resources have already been reserved, enabling RLF recovery to be implemented without the UE going via LTE_IDLE, in an LTE arrangement.

17 Claims, 4 Drawing Sheets

METHOD AND APPARATUS FOR RADIO LINK FAILURE RECOVERY IN A WIRELESS COMMUNICATIONS NETWORK

FIELD OF THE INVENTION

The present invention relates to a method and apparatus for radio link failure recovery in a wireless communications network, and more particularly, but not exclusively, to a method and apparatus implemented in accordance with the 3rd Generation Partnership Project (3GPP) evolved Universal Terrestrial Radio Access Network (E-UTRAN) and evolved Universal Terrestrial Radio Access (E-UTRA) specifications.

BACKGROUND

Currently, 3GPP is considering development of E-UTRA and E-UTRAN as set out in the technical specification 3GPP TS 36.300 v 8.3.0 (2007-12), incorporated herein by way of reference, and related documents. 3GPP Long Term Evolution (LTE) aims to enhance the Universal Mobile Telecommunications System (UMTS) standard, for example, by improving efficiency and services.

In E-UTRAN, user equipment (UE) communicates with a network node, NodeB (eNB), with data being sent on radio bearers (RBs) over a radio link between them. The eNB interfaces with a Mobile Management Entity (MME) via an interface designated as S1. The E-UTRAN network includes a plurality of eNBs and MMEs. The connection between the UE and the source eNB to which it is attached may be lost, this being known as radio link failure (RLF). It had previously been proposed that a UE experiencing an REF and reappearing in a cell of another eNB would be handled as a transition via an idle state, RRC_IDLE. In this mechanism, when there is RLF in the source eNB, the UE enters IDLE state and selects a new target eNB. When the UE has attached to the new target eNB, and received the system information for the target eNB, the UE may perform the access procedure to establish resources in the target eNB. However, this procedure is time-consuming.

RLF may be particularly likely during fading channel conditions, when handover from the source eNB to a target eNB may be imminent. To avoid going via the IDLE state, it has been suggested that a new eNB could be prepared beforehand to accept the UE by using the handover preparation procedure. The Handover_Request message can be sent to multiple eNBs which are thus able to recognize the UE, each of the eNBs being prepared as handover candidates. Then, the UE is able to carry on with its old context after having chosen the new target eNB during the mobility phase of the RLF.

The paper by Nokia Siemens Networks et al "Radio Link Failure Recovery", R2-072382, 3GPP TSG-RAN WG2 Meeting #58, incorporated herein by way of reference, discusses RLF recovery by preparing multiple eNBs using the handover procedure. A prepared eNB has the UE context and resources reserved, so by preparing multiple eNBs, the probability is increased that the UE can recover from RLF without needing to go via RRC_IDLE, thus reducing recovery time.

The paper by Nokia and Nokia Siemens Networks "Handover Failure Recovery" R-071717, 3GPP TSG-RAN WG2 Meeting #58, incorporated herein by way of reference, and the paper by Vodafone "Mobility in LTE_ACTIVE state, R2-0723823, GPP TSG-RAN WG2 Meeting #58, incorporated herein by way of reference, also consider the preparation of multiple eNBs during handover to avoid the UE going via the IDLE state.

With reference to FIG. 1, in one LTE network having handover with multiple eNB preparation, a source eNB 1 transmits a Handover_Request to a designated target eNB 2 and to other candidate eNBs 3 and 4, two of which are shown. The Handover_Request causes the designated target and candidate eNBs 2, 3 and 4 to reserve resources, shown at 5, 6 and 7, so that, if the UE attaches to one of the candidate eNBs 3 and 4 during RLF, recovery time is reduced. The eNBs 2, 3 and 4 each send a message Handover_Request_Ack to the source eNB 1 acknowledging the handover request. During RLF the UE appears within a cell associated with the designated target eNB 2, shown at 8. The target eNB 2 sends a Release_Resources message to the source eNB 1 once it has completed the handover procedure. The source eNB 1 then releases resources it has reserved for the UE and sends Free_Resource messages to the other candidate eNBs 3 and 4 to free the resources that they have reserved, shown at 9 and 10.

In another previous proposal, as set out in R2-074179, UE context information is sent to multiple eNBs that are candidates to be the target eNB to which handover eventually occurs, but no reservation of resources is made at these candidate eNBs. This permits a UE to attach to a new eNB within the RLF procedure without going via RRC_IDLE. In a variant, multiple candidate eNBs are sent UE context information and only one candidate eNB, that is the candidate eNB most likely to be the one to which the UE hands over, reserves resources.

BRIEF SUMMARY

According to a first aspect of the invention, a method for radio link failure recovery in a wireless communications network comprises designating a network node as a target node to accept a mobile terminal in the event of failure of a radio link between the mobile terminal and a source network node. One or more other network nodes are designated as candidate nodes. Resources are reserved at the target node. A handover command is sent to the mobile terminal when the target node is ready to accept handover of the mobile terminal from the source node. A timer is started to define a predetermined time period from when the handover command is sent and resources reserved at the one or more candidate nodes when the predetermined time period has elapsed without the mobile terminal attaching to the target node.

The invention is particularly applicable to arrangements in accordance with LTE but it may advantageously be used in networks complying with other specifications or standards. In LTE, the mobile terminal is a UE and the network nodes are eNBs.

When there is radio link failure, if the mobile terminal appears in the cell of a network node at which resources have been reserved on request from the source node, that node will recognize the mobile terminal and is able to initiate procedures to complete the connection without this needing to be set up from the beginning. In an LTE network, this avoids the UE entering the IDLE state, and thus reduces the time required to recover a radio link connection with the UE. In an arrangement in accordance with the invention, resources are initially reserved at the target node during RLF, but resources are only reserved at other candidate nodes after a predetermined time period. This deferral of the reservation of resources reduces overheads. For example, in LTE, the Handover_Request message, which instructs the node receiving the message to reserve resources, is delayed for the predetermined specified time period. Then, in the case where the UE re-appears at the source eNB within the first phase of the RLF, and before the time period has expired, no candidate eNBs will have been needlessly prepared and the associated messaging is avoided. In other cases, during RLF, the UE may connect to the designated target eNB at which resources have been reserved and the target node sends a message to the source node to release resources. Candidate eNBs are thus only prepared if the UE fails to either re-attach to the source node or undergo handover to the target node within the predetermined time period. Thus, the signalling load on the X2 interface between eNBs is reduced and resources are reserved at candidate nodes only when they are more likely to be required.

In one arrangement in accordance with the invention, the predetermined time period is calculated from the normal time duration for the source node to receive a message from the designated node to release resources after receiving a handover request acknowledgement from the designated node. For example, this may be set at the maximum duration of the 95 percent quantile. In another arrangement in accordance with the invention, the predetermined time period is calculated using a timer specified for the radio link failure procedure, and this time may be specific to individual mobile terminals. In LTE, this may be the T1 timer used in RLF, as set out in 3GPP TS 36.300 v 8.3.0 (2007-12) for example. Other timer, counter or event based parameters may be used to calculate the predetermined time period, such as the timer T2 of the RLF procedure in LTE implementations, or a counter which counts certain events, like positive slopes of a system-internal signal. A combination of these time period parameters may be used, for example, by selecting the minimum time period from a plurality of time periods calculated using respective different parameters.

Reserved resources may include allocating the time and frequency domain at the handover target node, related to its capacity for data transmission. Other resources may include a preamble, which is a special code, with which a UE can access to an eNB if there is no previous communication between the UE and the eNB. This access is carried out via the Random Access Channel (RACH). The UE randomly selects a preamble which is sent via the RACH. The preamble is used to recognize the response from the eNB. Such a RACH procedure is contention based. To avoid contention in case of a handover from a source eNB to a target eNB, the set of preambles is split into two basic parts: random preambles, which are randomly selected by the UE; and dedicated preambles, which the eNB sends to a specific UE. The target eNB may send a dedicated preamble to the UE via the source eNB within a transparent container, which is a data portion sent from a potential target eNB towards the UE. This data portion is actually sent from the potential target eNB via the current source eNB to the UE. The source eNB does not change this data portion, hence it being termed a "transparent container". A dedicated preamble is exclusively reserved for the specific UE only and thus avoiding another UE using the same preamble. The RACH access in case of handover is thus kept contention free. Dedicated preambles may thus be considered as reserved resources.

LTE currently only proposes that there be one handover target eNB, but in future versions, or in networks implemented in accordance with other standards or protocols, more than one handover target may be selected. For example, these may be organized in an order of precedence. In such a network, in addition to using at least one candidate node without reserving resources until the predetermined time period expires, there may be more than one target network node selected which is initially requested to reserve resources.

In one method in accordance with the invention, following radio link failure, when the mobile terminal attaches to a node, the node to which the mobile terminal is attached requests the source node to release resources. By attached it is meant that at least the initial steps of the connection process are carried out. The mobile terminal may attach to a node that is a handover target node or a candidate node. The source node may request those nodes, except that node to which the mobile terminal is attached, that have reserved resources to release them. It may be arranged that a node that has reserved resources releases them after a set time following the request to it to reserve resources. Thus resources are released even if a network node does not receive a release message.

According to a second aspect of the invention, a wireless communications network operates in accordance with a method in accordance with the first aspect.

BRIEF DESCRIPTION OF THE DRAWINGS

A method and embodiment of the present invention is now described by way of example only, and with reference to the accompanying drawing in which.

DETAILED DESCRIPTION

Figure 1:
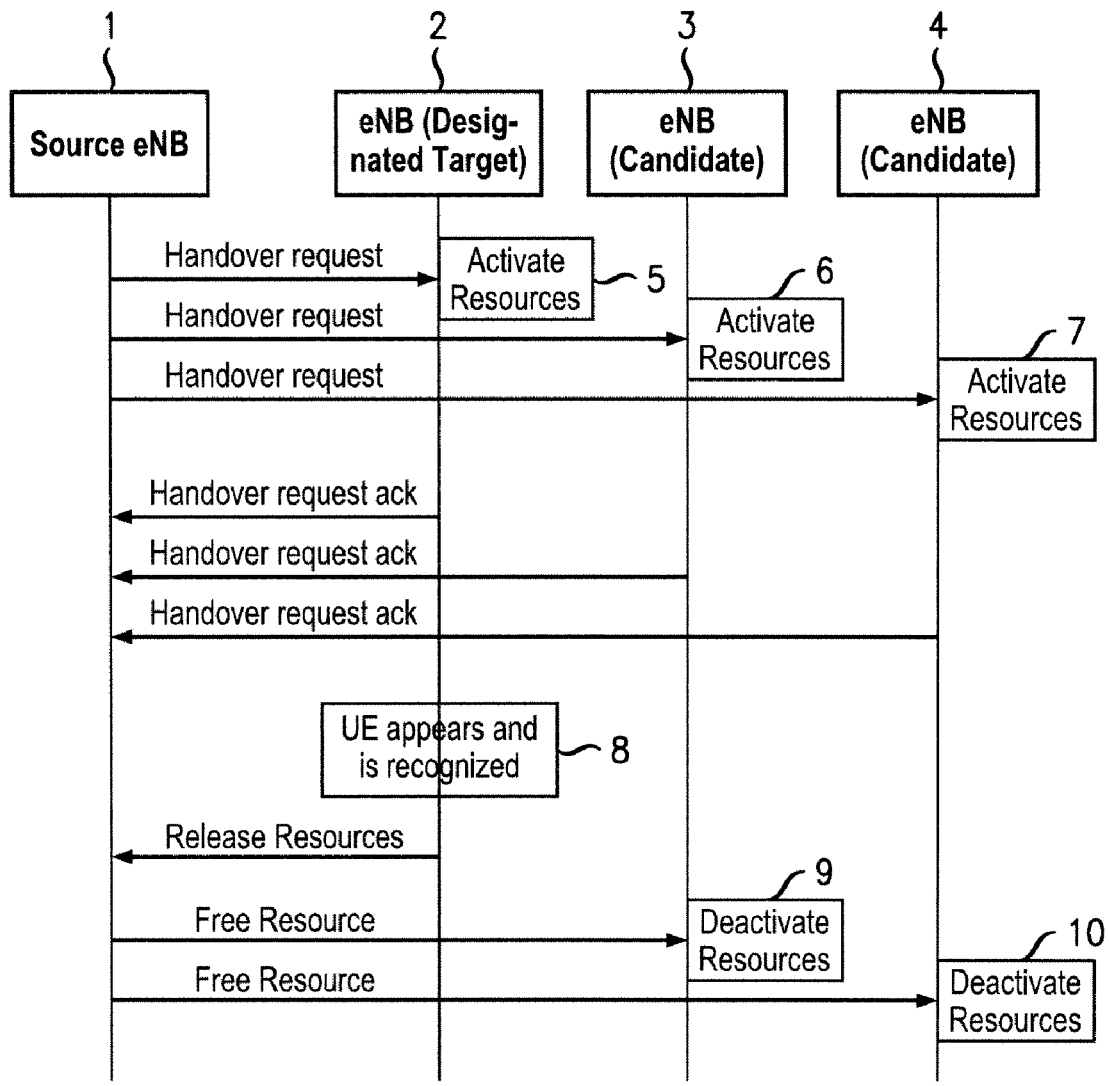
FIG. 1 schematically illustrates a prior arrangement using multiple node preparation.
Figure 2:
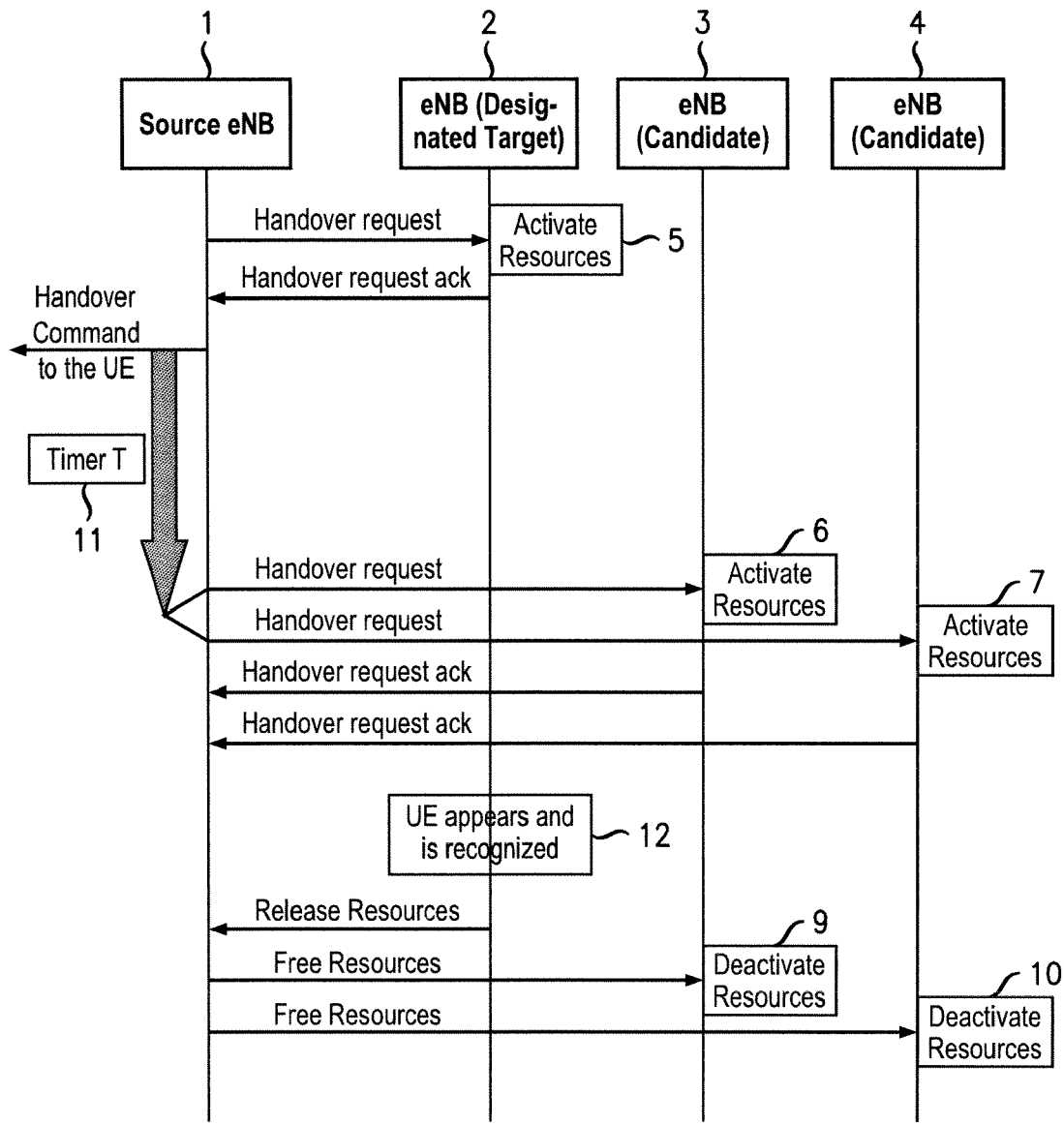
FIG. 2 schematically illustrates an arrangement in accordance with the invention in which there is deferred delivery of a Handover_Request to candidate eNBs after expiry of a predetermined time period.

With reference to FIG. 2, in an LTE network, a UE (not shown) is connected to a source eNB 1. A Handover_Request message sent to a target eNB 2 and it reserves resources in response, shown at 5: "Activate Resources". If the target eNB 2 is able to accept the UE, it sends a handover request acknowledgement message to the source eNB 1. The source eNB 1 then sends a Handover_Command to the UE and also triggers a timer T, as shown at 11, which in this arrangement is the timer T1 for RLF in LTE.

At the expiry of the timer T1, when the predetermined time period has expired, there has been no message sent from the target eNB 2 to the source eNB 1 to indicate that the UE has attached to it. Thus, the source eNB 1 then sends Handover_Request messages to other candidate eNBs 3 and 4. The candidate eNBs 3 and 4 reserve resources, shown at 6 and 7, and send a Handover_Request_Ack message back to the source eNB 1 if they are able to accept the UE. Thus, the Handover_Request message is sent to the target eNB 2 initially and then later to the candidate eNBs 3 and 4.

The UE then appears at the target eNB 2, shown at 12, and is recognized by the target eNB 2. The UE associates with the target eNB 2 which sends a Release_Resources message to the source eNB 1 and the source eNB 1 instructs the candidate eNBs 3 and 4 to release the resources they have reserved.

Figure 3:
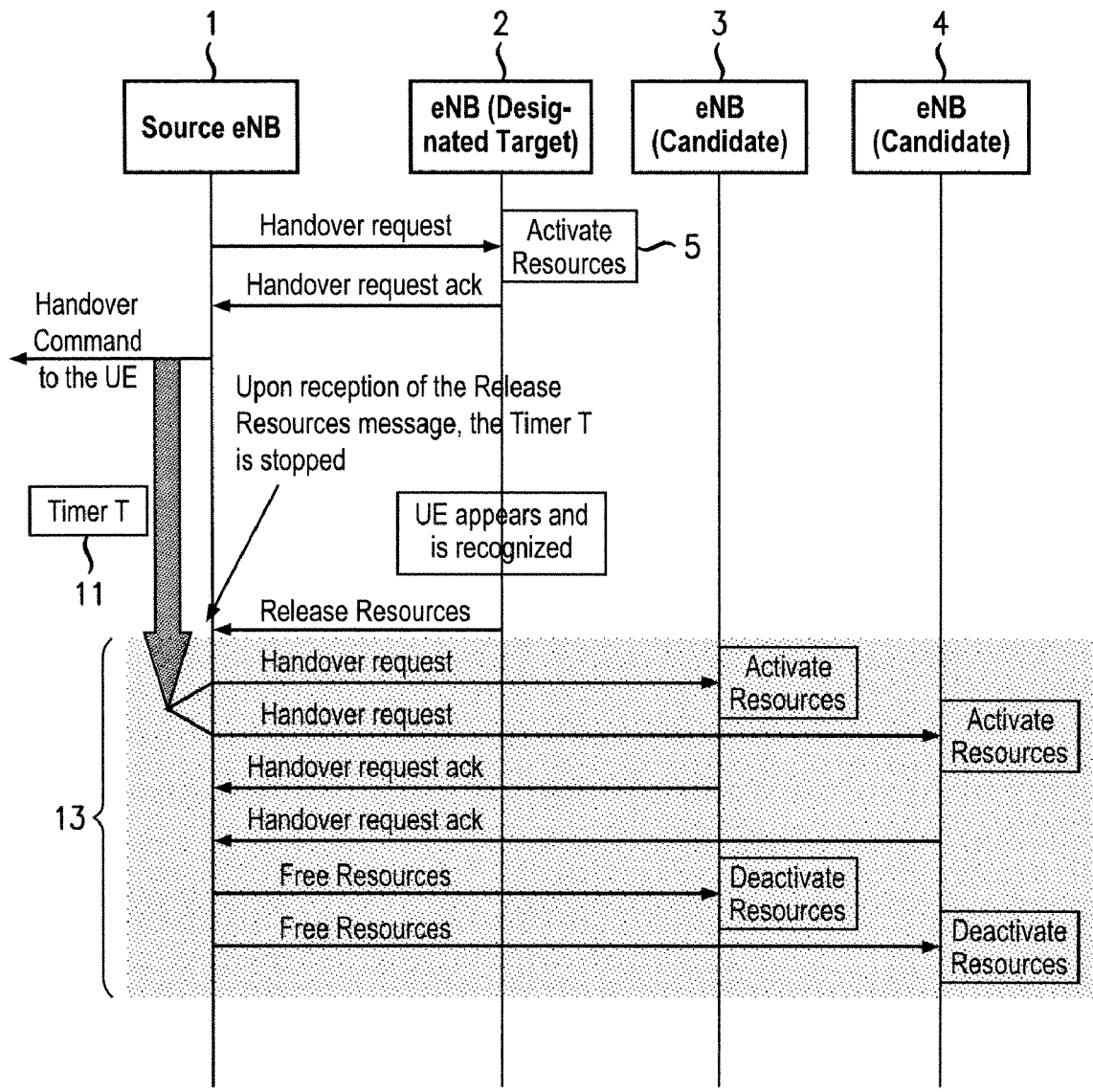
FIG. 3 schematically illustrates an arrangement in accordance with the invention in which a UE arrives at the target eNB before expiry of a predetermined time period.

With reference to FIG. 3, an alternative sequence to that shown in FIG. 2 is similar in that the target node eNB 2 reserves resources at 5. However, this time, the UE appears at the target node eNB 2, and the target node eNB 2 sends a message to the source eNB 1 requesting it to release resources, before expiry of the predetermined time period set by the timer T 11. Thus, the source eNB 1 does not need to request other candidate eNBs 3 and 4 to reserve resources, and the stages shown in the greyed out portion 13 are not carried out, thus avoiding the unnecessary use of resources and reducing signalling between the eNBs.

Figure 4:
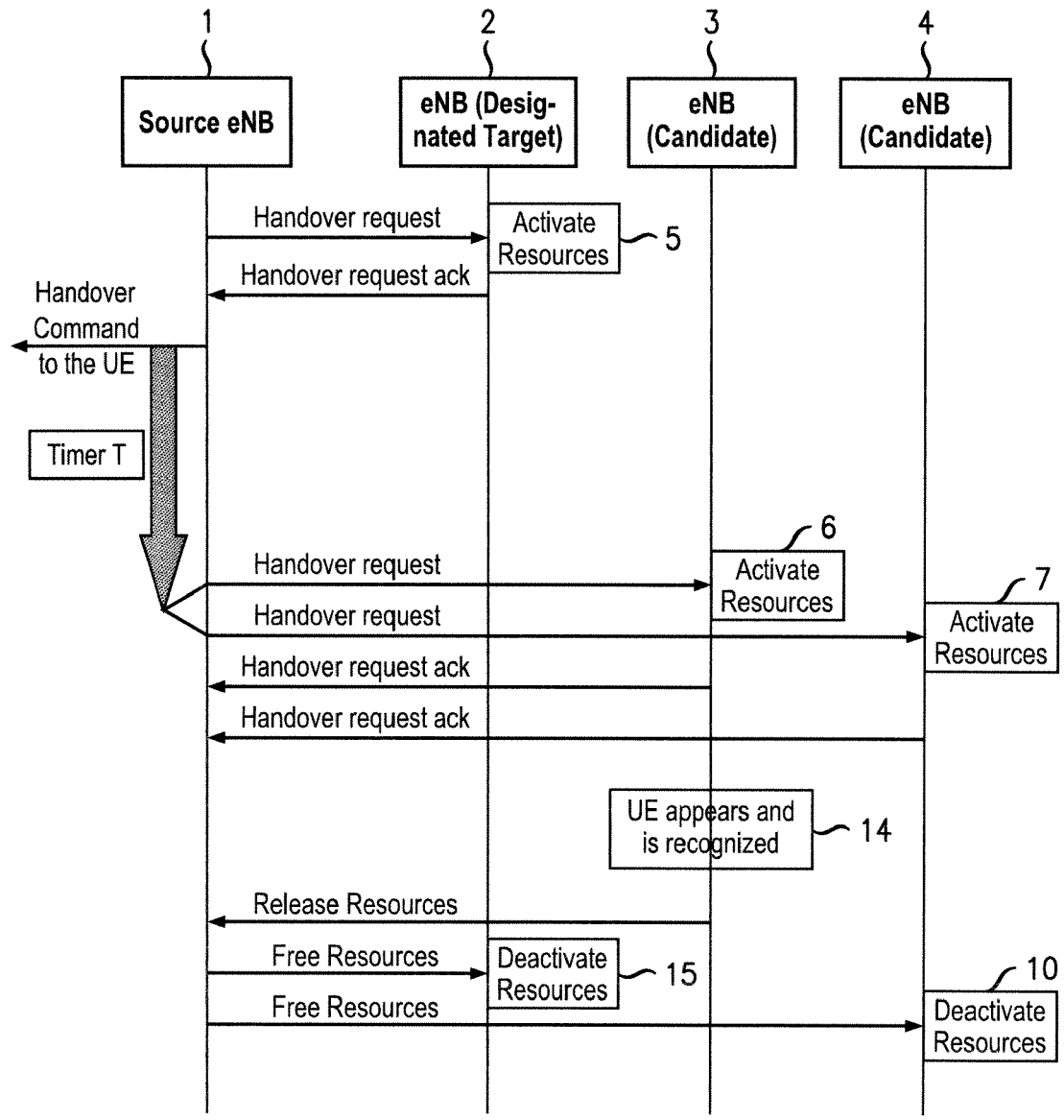
FIG. 4 schematically illustrates an arrangement in accordance with the invention in which a UE arrives at a candidate eNB after expiry of a predetermined time period.

With reference to FIG. 4, this illustrates the procedure when the UE does not appear at the target eNB 2, which has reserved resources shown at 5, during the predetermined time period T or after expiry of the time period T. Following expiry of the time period T, the source eNB 1 sends Handover_Request messages to the two candidate eNBs 3 and 4 and receives acknowledgements from both of them. The candidate eNBs 3 and 4 reserve resources at 6 and 7. The UE appears at one of the candidate eNBs 3, shown at 14, which accordingly requests the source eNB 1 to release the resources reserved for the UE once the UE has attached to its new eNB 3. The source eNB 1 then messages the target eNB 2 and the other candidate eNB 4 to instruct them to free the resources they have reserved for the UE, shown at 15 and 10.

In other arrangements the duration of the predetermined time period T is set to a value calculated by a combination, such as the minimum value, of one or more of the following components: (a) a time the source eNB 1 normally has to wait until the Release_Resources message arrives from the target eNB 2, for example, the maximum duration of the 95 percent quartile; (b) the timer T1 used for the Radio Link Failure procedure in LTE, and this value may be set individually per UE; and (c) another timer, counter or event based on handover or RLF parameters, such as the timer T2 of the RLF procedure in LTE, or combination of these.

The present invention may be embodied in other specific forms and implemented by other methods without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for radio link failure recovery in a wireless communications network, comprising:
    designating a network node as a target node to accept a mobile terminal in the event of failure of a radio link between the mobile terminal and a source network node;
    designating one or more other network nodes as candidate nodes;
    reserving resources at the target node;
    sending a handover command to the mobile terminal when the target node is ready to accept handover of the mobile terminal from the source node;
    starting a timer to define a predetermined time period from when the handover command is sent; and
    reserving resources at the one or more candidate nodes when the predetermined time period has elapsed without the mobile terminal attaching to the target node;
    wherein the predetermined time period is calculated from a time duration for the source node to receive a message from the designated target node to release resources after receiving a handover request acknowledgement from the designated target node.

2. The method as claimed in claim 1 and including sending a handover request to a node to request it to reserve resources.

3. The method as claimed in claim 1 and, when the mobile terminal has attached to a node, including the step of the source node sending a request to free resources to other nodes that have reserved them.

4. The method as claimed in claim 1 and wherein the predetermined time period is calculated using a timer specified for radio link failure procedure.

5. The method as claimed in claim 4 and wherein the predetermined time period is calculated using the timer for radio link failure procedure and is set individually for each mobile terminal.

6. The method as claimed in claim 1 and wherein the predetermined time period is calculated using a combination of said normal time duration for the source node to receive a message from the designated target node to release resources and using a timer specified for radio link failure procedure.

7. The method as claimed in claim 1 wherein the network is a Long Term Evolution (LTE) network.

8. The method as claimed in claim 7 and wherein the predetermined time period is calculated using at least one of a first standardized LTE timer T1 and a second standardized LTE timer T2.

9. A wireless communications network comprising: a plurality of network nodes where a mobile terminal accesses the network via a source network node, another network node is designated as a target node to accept a mobile terminal in the event of failure of a radio link between the mobile terminal and the source network node, and one or more other network nodes are designated as candidate nodes; and a timer to define a predetermined time period from when a handover command is sent to the mobile terminal when the target node is ready to accept handover of the mobile terminal from the source node, and the network being operative to reserve resources at the target node, start the timer and reserve resources at the one or more candidate nodes when the predetermined time period has elapsed without the mobile terminal attaching to the target node; wherein the predetermined time period is calculated from a normal time duration for the source node to receive a message from the designated target node to release resources after receiving a handover request acknowledgement from the designated target node.

10. The network as claimed in claim 9, wherein the source network node sends a handover request to a node to request it to reserve resources.

11. The network as claimed in claim 9, wherein, when the mobile terminal has attached to a node, the source network node sends a request to free resources to other nodes that have reserved resources.

12. The network as claimed in claim 9, wherein the predetermined time period is calculated using a timer specified for a radio link failure procedure.

13. The network as claimed in claim 12, wherein the predetermined time period is calculated using the timer for radio link failure procedure and is set individually for each mobile terminal.

14. The network as claimed in claim 9, wherein the predetermined time period is calculated using a combination of said normal time duration for the source node to receive a message from the designated target node to release resources and using a timer specified for a radio link failure procedure.

15. The network as claimed in claim 9 wherein the network is a Long Term Evolution (LIE) network.

16. The network as claimed in claim 15, wherein the predetermined time period is calculated using at least one of a first standardized LTE timer T1 and a second standardized LTE timer T2.

17. A method for radio link failure recovery in a wireless communications network, comprising:
    designating a network node as a target node to accept a mobile terminal in the event of failure of a radio link between the mobile terminal and a source network node;

designating one or more other network nodes as candidate nodes;

reserving resources at the target node;

sending a handover command to the mobile terminal when the target node is ready to accept handover of the mobile terminal from the source node;

starting a timer to define a predetermined time period from when the handover command is sent; and reserving resources at the one or more candidate nodes when the predetermined time period has elapsed without the mobile terminal attaching to the target node;

wherein the predetermined time period is calculated from a time duration for the source node to receive a message from the designated target node to release resources after receiving a handover request acknowledgement from the designated target node.

* * * * *